US007360954B1

(12) United States Patent
Seaver et al.

(10) Patent No.: US 7,360,954 B1
(45) Date of Patent: Apr. 22, 2008

(54) LOW SPEED DATA PATH FOR SFP-MSA INTERFACE

(75) Inventors: Terry R. Seaver, Pleasanton, CA (US); Pirooz Tooyserkani, Saratoga, CA (US); Donald B. Stone, San Jose, CA (US); Sharat Prasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 778 days.

(21) Appl. No.: 10/809,302

(22) Filed: Mar. 25, 2004

(51) Int. Cl.
*G02B 6/36* (2006.01)
*H04B 10/00* (2006.01)

(52) U.S. Cl. .................... 385/92; 385/14; 385/88; 398/139; 398/135

(58) Field of Classification Search .................. 385/14, 385/76, 77, 88, 89, 92, 94, 53, 78; 398/135, 398/136, 137, 138, 139
See application file for complete search history.

(56) References Cited

U.S. PATENT DOCUMENTS

| 6,612,868 | B2 | 9/2003 | Hwang | 439/607 |
|---|---|---|---|---|
| 6,807,021 | B2 | 10/2004 | Kurashima | 359/815 |
| 6,819,568 | B2 | 11/2004 | Cao | 361/728 |
| 6,836,493 | B2 | 12/2004 | Mahowald et al. | 372/38.01 |
| 6,872,094 | B1* | 3/2005 | Murr et al. | 439/607 |
| 7,107,414 | B2* | 9/2006 | Hidai et al. | 711/154 |
| 7,204,648 | B2* | 4/2007 | Aronson | 385/92 |
| 2002/0181895 | A1* | 12/2002 | Gilliland et al. | 385/88 |
| 2004/0033079 | A1* | 2/2004 | Sheth et al. | 398/135 |
| 2005/0111845 | A1* | 5/2005 | Nelson et al. | 398/138 |
| 2005/0196119 | A1* | 9/2005 | Popovic et al. | 385/134 |

OTHER PUBLICATIONS

"Cooperation Agreement for Small Form-Factor Pluggable Transeivers", http://www.schelto.com/SFP/SFT%20MSA%20091400.htm, pp. 1-54.
"Cooperation Agreement for Small Form-Factor Pluggable Transeivers", http://www.schelto.com/SFP/SFT%20MSA%20091400.htm, pp. 1-54, no date.

* cited by examiner

*Primary Examiner*—Brian M. Healy
(74) *Attorney, Agent, or Firm*—Aka Chan LLP (57) ABSTRACT

Methods and apparatus for enabling a protected circuit path to be created efficiently are disclosed. In accordance with one embodiment of the present invention, a method for creating a protected circuit path within an optical network system includes identifying a first node, a second node, and a third node. Once the nodes are identified, a pseudo link or a virtual link may be created between the second node and the third node. A first circuit path is then routed between the first node and the second node, and a second circuit path which protects that first circuit path is routed between the first node and the third node using the pseudo link.

24 Claims, 9 Drawing Sheets

LOW SPEED DATA PATH FOR SFP-MSA INTERFACE

BACKGROUND OF THE INVENTION

1. Field of Invention

The present invention relates generally to network systems. More particularly, the present invention relates to lower data rate telecommunication modules which conform with the Small Form Factor Pluggable Transceiver Multi-source Agreement (SFP-MSA) standard.

2. Description of the Related Art

The demand for data communication services is growing at an explosive rate. Much of the increased demand is due to the fact that more residential and business computer users are becoming connected to the Internet. To address the demand for data communication services, the use of optical networks, such as a synchronous optical network (SONET), is becoming more prevalent. A SONET network is an example of a time division multiplexed (TDM) network. TDM networks generally allocate single lines to be used amongst multiple users, or customers of data communication services. The single lines may each be divided into slots of time during which each user has access to the single lines.

The types of traffic being carried by the Internet are shifting from lower bandwidth applications towards high bandwidth applications which include voice traffic and video traffic. Since different users may require equipment to transmit and receive traffic associated with different data rates, many vendors provide equipment which supports a variety of different data rates. The equipment which supports a variety of different interfaces often includes pluggable modules, e.g., optical modules, which vary depending upon the type of service the equipment is to support. For example, pluggable modules may be chosen based on data rates which are anticipated, and based on whether signals are expected to be long haul or short haul.

In order to enable optical modules, e.g., transceivers, to be readily swapped into and out of equipment, standard form factors for such modules are typically defined. When modules have the same form factors, the ability to configure equipment to meet changing needs is enhanced, as it becomes a relatively simple matter to replace one module with another. The Small Form-Factor Pluggable Transceiver Multisource Agreement (SFP-MSA) standard, which is incorporated herein by reference in its entirety, is one standard to which pluggable interfaces may conform. The SFP-MSA standard specifies dimensions and pinouts for a pluggable transceiver module that supports standards for fiber optic systems such as Asynchronous Transfer Mode (ATM), FDDI, Fiber Channel, Fast Ethernet, Gigabit Ethernet, SONET, and Synchronous Digital Hierarchy (SDH) applications.

Figure 1:
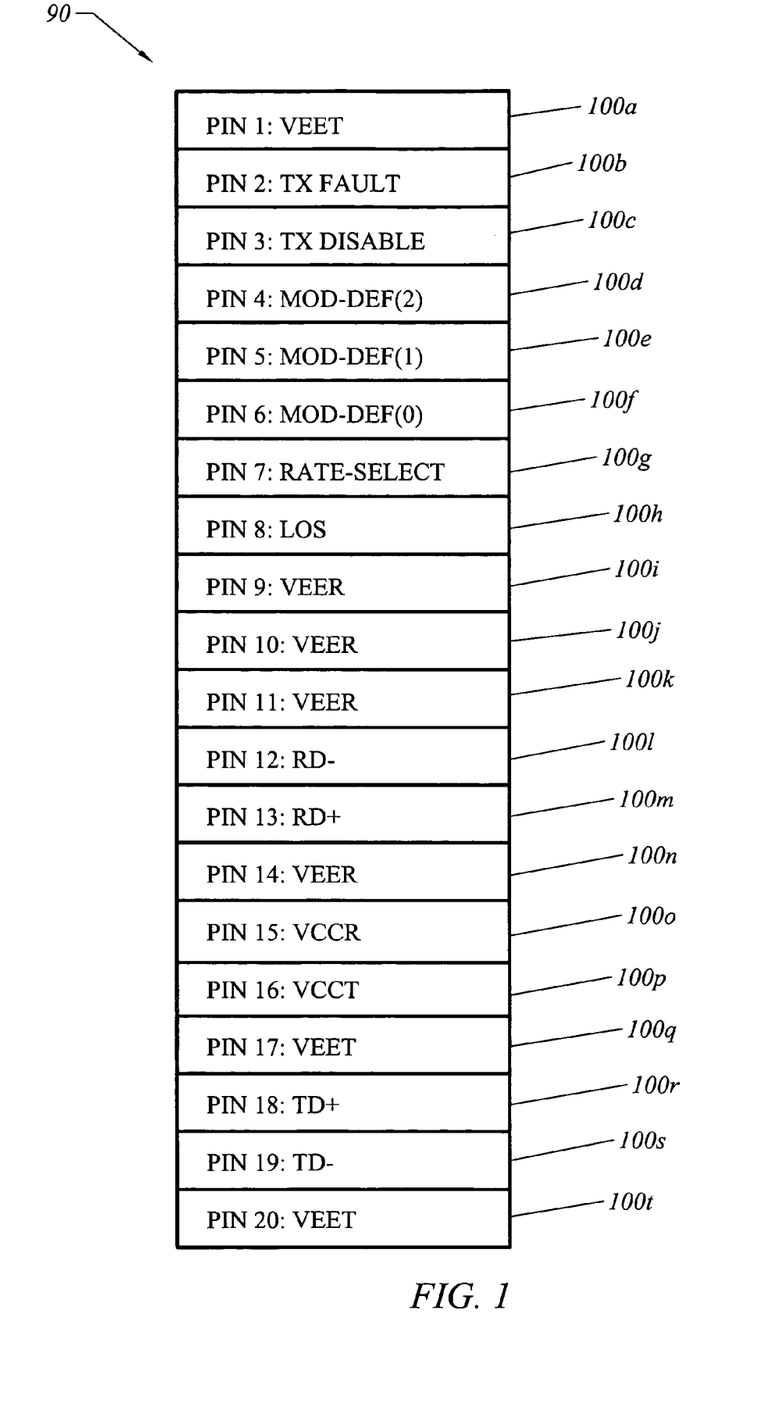
FIG. 1 is a diagrammatic representation of the twenty pins specified in the Small Form-Factor Pluggable Transceiver Multisource Agreement (SFP-MSA) standard.

The SFP-MSA standard generally defines twenty pin positions and functions that are to be used by pluggable interfaces which are in compliance with the SFP-MSA standard. FIG. 1 is a diagrammatic representation of the twenty pins specified in the SFP-MSA standard. A connector block 90 which is suitable for use on a host board (not shown) or a SFP transceiver includes pins 100 which are typically oriented such that pins 100a-j are positioned facing towards a bezel (not shown) associated with the host board and pins 100k-t are positioned facing towards an application specific integrated circuit (ASIC) or other circuitry (not shown) on the host board.

A first pin 'VEET' 100a, a seventeenth pin 'VEET' 100q, and a twentieth pin 'VEET' 100t are transmitter grounds, while a sixteenth pin 'VCCT' 100p is a transmitter power pin. Ninth, tenth, and eleventh pins 'VEER' 100i-k, as well as fourteenth pin 'VEER' 100n are receiver grounds, while a fifteenth pin 'VCCR' 100o is a receiver power pin.

A second pin 'TX FAULT' 100b is a transmitter fault indication pin, and is an open collector or drain output which, when low, indicates normal operation of an sfp-MSA compliant module plugged into connector block 90. Hence, 'TX FAULT' 100b is a status line associated with a module plugged into connector block 90. A third pin 'TX DISABLE' 100c is a transmitter disable pin, and is a control line from a host board (not shown) to a module plugged into connector block 90 which enables the transmitter optical output of the module to be shut down or otherwise disables as needed.

Fourth, fifth, and sixth pins 'MOD-DEF( )' 100d-f are module definition pins which may be used to enable the module interfaced with connector block 90 to be substantially identified. A seventh pin 'RATE-SELECT' 100g is a control line from a host board (not shown) to a module plugged into connector block 90 which enables a selection to be made between a full receiver bandwidth and a low receiver bandwidth. An eighth pin 'LOS' 100h is a loss of signal pin and, hence, is a status line. LOS 100h is an open collector or a drain output which, when low, is arranged to indicate that a module plugged into connector block 900 is operating normally.

A twelfth pin 'RD-' 100l and a thirteenth pin 'RD+' 100m are differential receiver outputs, while an eighteenth pin 'TD+' 100r and a nineteenth pin 'TD-' 100s are differential transmitter outputs. 'RD-' 100l and 'RD+' 100m are a differential pair of lines that terminate at the deserializer of the host board's SERDES (not shown), while 'TD+' 100r and 'TD-' 100s are a differential pair of lines that effectively terminate at the serializer of the host board's SERDES (not shown).

Figure 2:
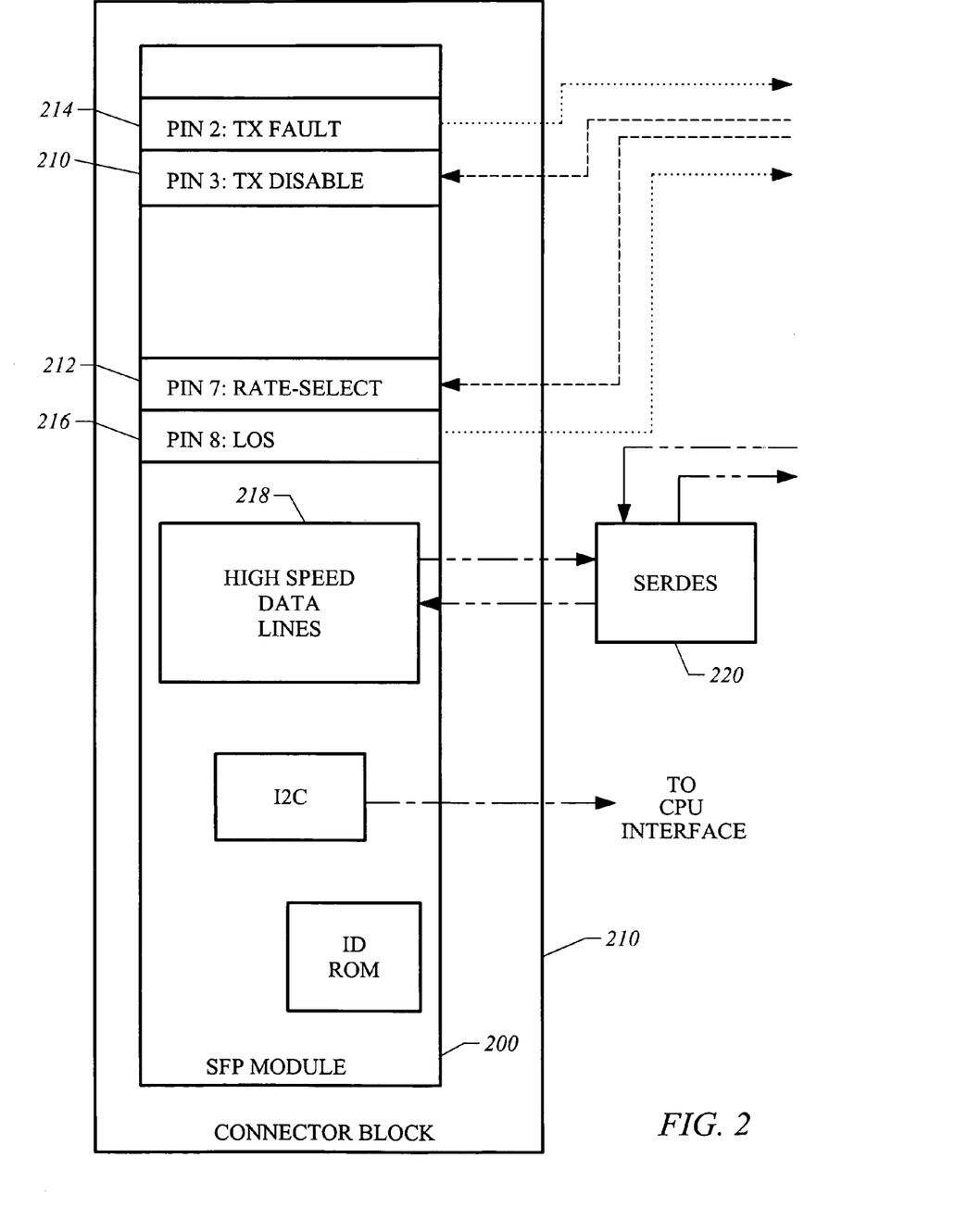
FIG. 2 is a diagrammatic representation of an SFP module which is interfaced in a connector block.

In general, differential lines such as those associated with 'RD-' 100l and 'RD+' 100m are high speed data lines, or data lines which are suitable for carrying Gigabit Ethernet traffic or Fiber Channel traffic. Such high speed data lines effectively terminate at a SERDES on a host board, while other lines associated with an SFP module may bypass the SERDES. FIG. 2 is a diagrammatic representation of an SFP module which is interfaced in a connector block of a host board. An SFP module 200 which is "plugged into" or otherwise interfaced with a connector block 210 of a host board. As shown, while control lines associated with a 'TX DISABLE' pin 210 and a 'RATE-SELECT' pin 212, as well as status lines associated with a 'TX FAULT' pin 214 and an 'LOS' pin 216, substantially bypass a SERDES 220, high speed data lines 218 associated with SFP module 200, e.g., a line associated with a 'RD-' pin and a line associated with a 'RD+' pin, are substantially connected to SERDES 220.

In some instances, users may wish to use low speed transceiver modules, as for example for T1/E1 or T3/E3 interfaces, in addition to high speed modules. By way of example, if a user uses one or more high speed SFP modules to aggregate Gigabit Ethernet signals into a 2.5 Gigabit Trunk circuit, they may also wish to use one or more low speed SFP modules to transmit and receive PBX data along with the Gigabit Ethernet signals on the same trunk. While dedicated lower speed data lines could be used to transmit and to receive the PBX data, obtaining those lower speed data lines may be much more expensive than sharing high speed trunk bandwidth that might otherwise be effectively wasted.

A data path designed for gigabit rate services such as Fiber Channel or Gigabit Ethernet typically has a termination at a SERDES which has clock and data recovery (CDR), as previously mentioned. Since a SERDES generally has a limited frequency range that may only operate at frequencies of down to approximately thirty megahertz (MHz), the SERDES generally does not operate as intended for signals with some low speed frequencies associated with telecommunication, herein and after "telecom," interfaces such as T1 and T3. Further, since line interface chips, as for example line interface units (LIUs) that are commonly available for interface to T1 and T3 telecom interfaces convert line signals to a pair of single ended clock and data signals in a transmit direction and a receive direction, signals associated with T1 and T3 telecom interfaces are generally incompatible with the differential pair data path of the SFP-MSA standard.

Although logic may be added to an SFP transceiver module to convert separate clock and data signals created by an LIU into single combined differential pair signals, such logic often proves to be expensive to implement. In addition to adding cost to the manufacturing of SFP transceiver modules, adding logic to SFP transceiver modules that converts separate clock and data signals into single combined differential pair signals may cause the size of the SFP transceiver modules to be significantly increased, when components associated with such logic may not fit into typically small SFP transceiver modules.

Therefore, what is desired is a method and an apparatus for enabling low speed data paths through SFP-MSA modules. More specifically, what is needed is a system which makes it possible for lower data rate telecom interfaces such as T1/E1 and T3/E3 interfaces to be used on SFP compliant transceiver modules.

SUMMARY OF THE INVENTION

The present invention relates to a system for providing a low speed data path through a Small Form Factor Pluggable Transceiver Multi Source Agreement (SFP-MSA) interface. According to one aspect of the present invention, a method for providing a data path through an SFP transceiver which is substantially interfaced with a host device and has a plurality of single-ended pins includes determining if the SFP transceiver is for use at lower speed(s). The method also includes using the plurality of single-ended pins to provide at least one of a TX CLOCK signal, a TX DATA signal, an RX CLOCK signal, and an RX DATA signal if it is determined that the SFP transceiver is a lower speed transceiver.

In one embodiment, the method also includes using the single-ended pins to provide at least one control signal and at least one status signal when it is determined that the SFP transceiver is not being used for the lower speed application. In another embodiment, the at least one of the TX CLOCK signal, the TX DATA signal, the RX CLOCK signal, and the RX DATA signal is arranged to pass through a switching mechanism which is arranged to enable the single-ended pins to be in communication with a suitable logic module of the host device.

Allowing a low speed data path to be present in a device which has an SFP-MSA interface enables both relatively high data rate telecom applications, e.g., Fiber Channel and Gigabit Ethernet, and relatively low data rate telecom applications, e.g., T1/E1 and T3/E3, to use the same SFP compliant transceiver. Enabling both low speed data paths and high speed data paths to pass through the same SFP compliant transceiver in a device with an SFP-MSA interface enhances the usefulness of the device substantially without compromising the size of the SFP compliant transceiver. By using status and control pins of the SFP compliant transceiver to carry T1/E1 or T3/E3 data, the serializer-deserializer (SERDES) of the device may be bypassed by the T1/E1 or T3/E3 data, thereby substantially avoiding issues associated with operating the SERDES at frequencies of interest for telecom interfaces such as T1/E1 or T3/E3.

According to another aspect of the present invention, a method for providing a data path through an SFP transceiver that is substantially interfaced with a host device and has a SERDES as well as a plurality of lines which substantially bypass the SERDES includes determining when the SFP transceiver is arranged to support lower speed applications. The method also includes using a plurality of pins of the SFP transceiver that interface with the plurality of lines which substantially bypass the SERDES to provide at least one of a TX CLOCK signal, a TX DATA signal, an RX CLOCK signal, and an RX DATA signal when it is determined that the SFP transceiver is suitable for use in supporting the lower speed applications.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Users of modules in compliance with the Small Form Factor Pluggable Transceiver Multisource Agreement (SFP-MSA) may wish to use some low speed modules as well as high speed modules. That is, the ability to use the modules for relatively low speed interfaces, as for example T1/E1 or T3/E3 interfaces, in addition to modules for relatively high speed interfaces, e.g., gigahertz frequencies, may be desired.

By way of example, it may be desirable to use one or more SFP-MSA compliant modules capable of being used to transmit and to receive up to 2.5 Gigabits of data and one or more low speed modules to send and receive PBX data at lower speeds along with Gigabit Ethernet signals into a single trunk circuit. While logic may be added to a module to convert separate clock and data signals created by a line interface unit (LIU) into single combined differential pair signals as used in SFP-MSA compliant modules, such logic often proves to be difficult and impractical to implement within the confines specified in the SFP-MSA, as will be understood by those skilled in the art.

SFP-MSA compliant transceiver modules have a plurality of status and control lines which may be used to transmit and to receive data, and which substantially bypass a serializer-deserializer (SERDES) which is interfaced with high speed data lines, i.e., arranged to process differential pair signals. When lower data rate telecom applications than gigabit telecom applications are desired, four control and status pins of an SFP transceiver that have single-ended logic, as defined by the SFP-MSA standard, may be used as input to and output from the SFP transceiver. The use of four pins is sufficient to enable lower data rate telecom applications to transmit and to receive clock and data signals of standard LIU interfaces for lower data rate telecom interfaces, e.g., T1/E1 and T3/E3 interfaces. The proper selection of voltage levels, as for example LVTTL or LVCMOS voltage levels, enables status and control pins of an SFP compliant module which is modified for use in lower data rate telecom applications to be compatible with the SFP-MSA standard. Hence, if such a module is mistakenly plugged into a socket or a connector block used with a standard SFP compliant module, i.e., a module in which status and control lines are used as specified in the SFP-MSA standard, substantially no damage is done to either the module or the unit of which the socket is a part. Conversely, when a standard SFP compliant module is plugged into a socket arranged to be used a modified SFP compliant module, or an SFP compliant module in which control and status pins may be used to transmit and to receive clock and data signals, substantially no damage is done to either the module of the unit of which the socket is a part.

Using control and status lines of an SFP module to transmit and to receive clock and data signals associated with lower data rate telecom applications enhances the usefulness of equipment using the SFP modules. When SFP modules are available for use in both lower rate telecom applications and higher rate telecom applications, a user may then send a wider range of signals over that equipment using the those SFP modules. For example, a lower speed signals may be carried substantially for free when higher speed signals are effectively paid for, when SFP modules are available for use in both lower rate telecom applications and higher rate telecom applications.

Figure 3:
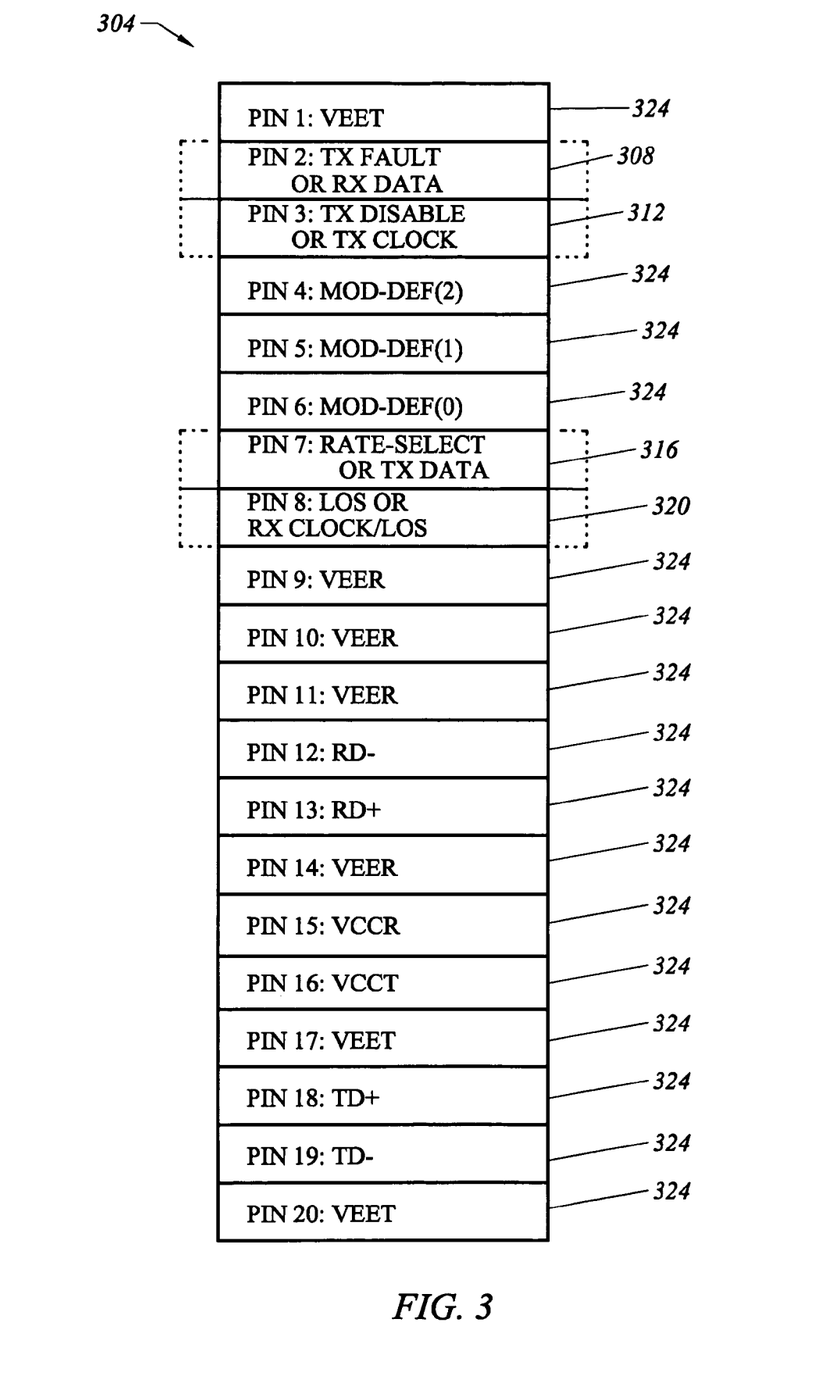
FIG. 3 is a diagrammatic representation of the pinouts of an SFP compliant module which may be used for lower data rate telecom or low speed applications in accordance with an embodiment of the present invention.

FIG. 3 is a diagrammatic representation of the pinouts of an SFP compliant module which may be used for lower data rate telecom or low speed applications in accordance with an embodiment of the present invention. A connector block 304 includes twenty pins. A second pin 308, which is a 'TX FAULT' status pin for high speed applications, is used as an 'RX DATA' pin for receiving data in low speed applications. A third pin 312, which is a 'TX disable' control pin for high speed applications, is used as a 'TX CLOCK' pin for transmitting a clock signal in low speed applications. A seventh pin 316, which is a 'RATE-SELECT' control pin that is used to select between a full or reduced receiver bandwidth for high speed applications, is used as a 'TX DATA' pin for transmitting data in low speed applications. Finally, an eighth pin 320, which is a 'LOS' status pin that is used to indicate when a signal is lost for high speed applications, is both an 'RX CLOCK' pin and an 'LOS' pin in low speed applications. When pin 320 is used as an 'RX CLOCK' pin and an 'LOS' pin, a clock signal is received when a clock signal is appropriate and a loss of signal indication is received when a signal is lost. Substantially all other pins 324 are as specified in the SFP-MSA standard.

Figure 4:
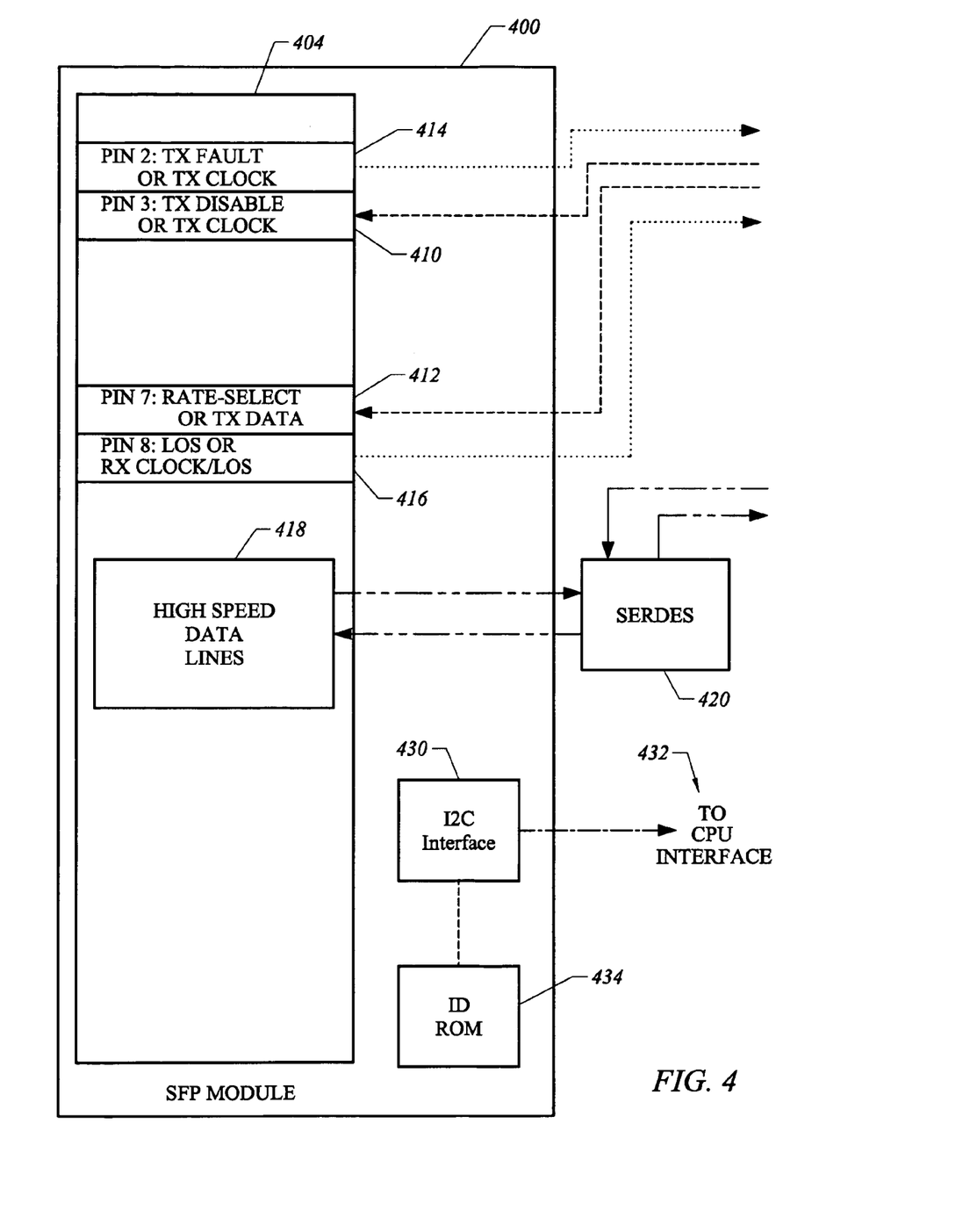
FIG. 4 is a diagrammatic representation of an SFP compliant module in accordance with an embodiment of the present invention.

FIG. 4 is a diagrammatic representation of an SFP module in accordance with an embodiment of the present invention. An SFP module 400 includes a connector 404 which is arranged to interface with a cage, for example, on a host board. High speed data lines 418 are provided to a SERDES 420, and SERDES 420 also serves to provide high speed data to high speed data lines 418. An I2C interface 430, which is in communication with a central processing unit (CPU) interface 432 of a host board, is used to read an ID ROM 434 of SFP module 400 to determine a type associated with SFP module 400. That is, I2C interface 430 is used to read ID ROM 434 to determine whether SFP module 400 is suitable for use in transmitting and receiving data at relatively low speeds.

When SFP module 400 is used to send a relatively low speed signal, a second pin 414, which is generally used as a 'TX FAULT' status pin for transmitting an indication of a fault for relatively high speed applications, is used as an 'RX DATA' pin which receives data sent at relatively low speeds, as previously mentioned. A third pin 410, which is generally used as a 'TX DISABLE' control pin for relatively high speed applications, is used as a 'TX CLOCK' pin at relatively low speeds. A seventh pin 412 is used as a 'TX DATA' pin at relatively low speeds, and an eighth pin 416 is used as an 'RX CLOCK' or an 'LOS' pin at relatively low speeds as appropriate.

Figure 5:
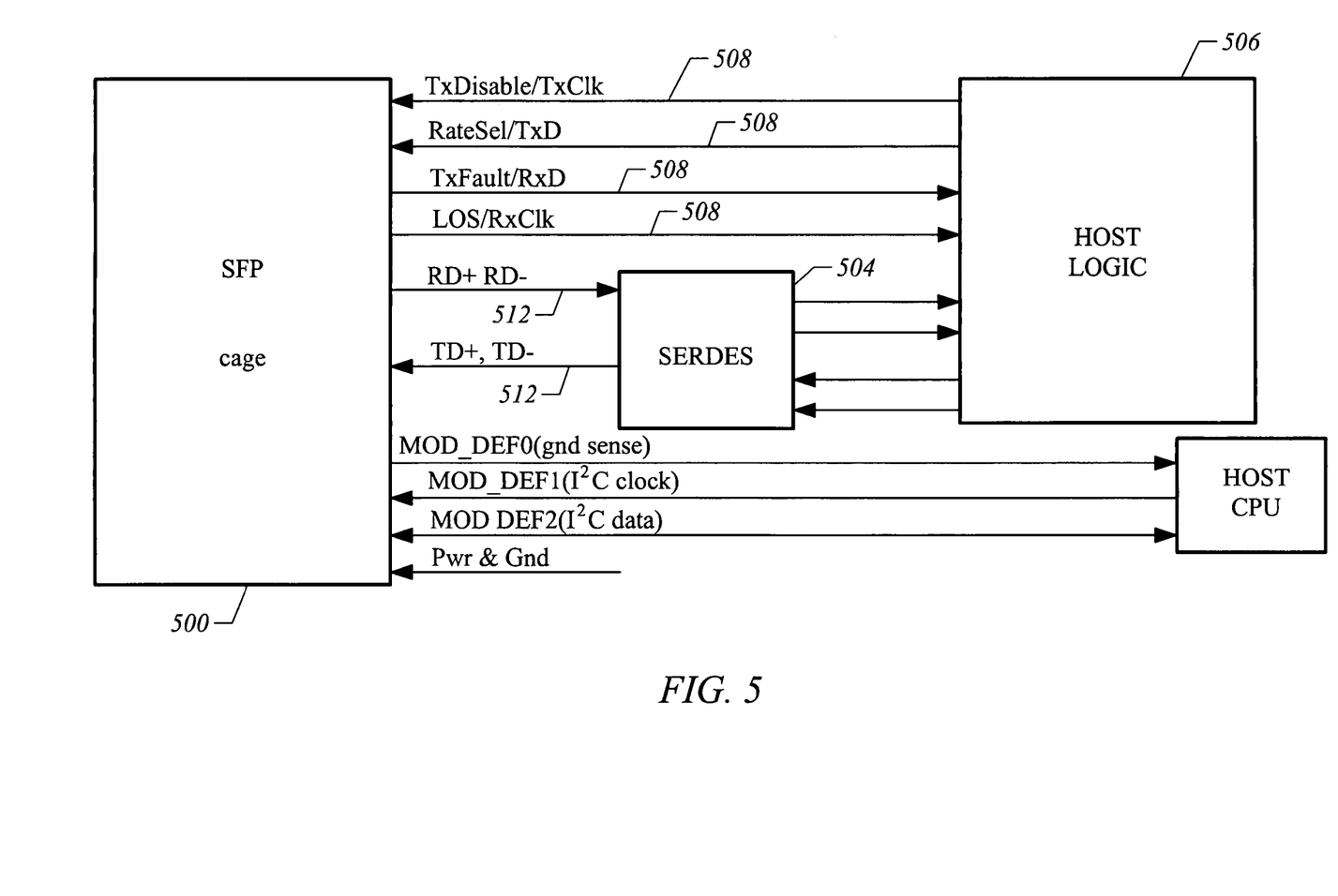
FIG. 5 is a diagrammatic representation of lines, e.g., data lines, and components which are included on a host board in accordance with an embodiment of the present invention.

As shown, pins 410, 412, 414, 416 are not in substantially direct communication with SERDES 420. Hence, pins 410, 412, 414, 416 may be used to enable SFP module 400 to support lower data rate telecom applications. Low speed data lines may substantially directly communicate with the low speed logic of a host board, as shown in FIG. 5, or high speed data lines may be in communication with the SERDES and high speed logic of the host board. FIG. 5 is a diagrammatic representation of lines, e.g., data lines, and components which are included on a host board in accordance with an embodiment of the present invention. Low speed data lines 508 are used to enable data to be transmitted between an SFP cage 500, which is arranged to receive an SFP module such as module 400 of FIG. 4, and a host low speed logic 506. High speed data lines 512, which are differential pairs, are used to enable SFP cage 500 to be in communication with a SERDES 504, which is coupled to high speed logic 506, as will be described below with respect to FIG. 6. Low speed data lines 508, which may also be used as control and status lines, are not coupled to the SERDES 506.

Figure 6:
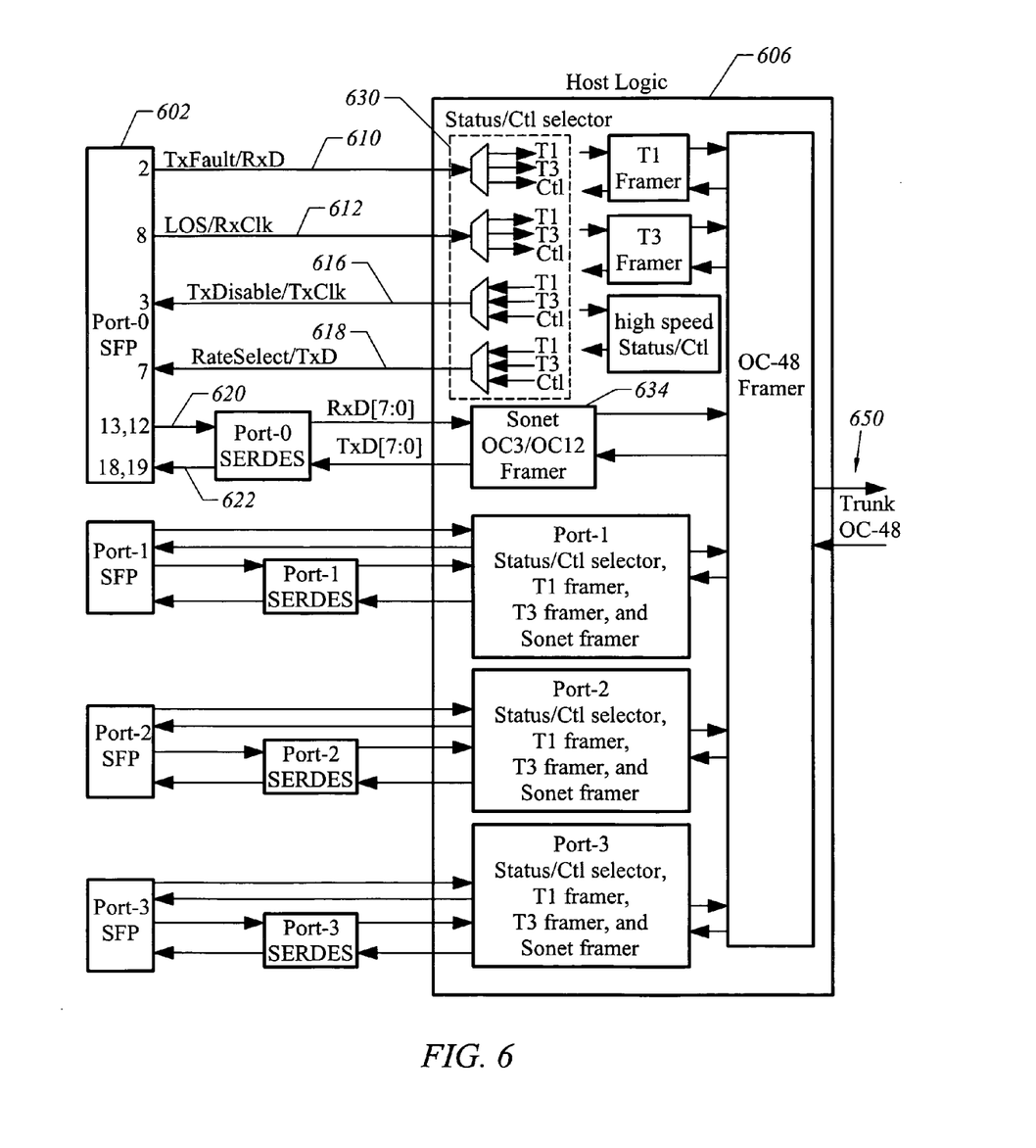
FIG. 6 is a diagrammatic representation of a client field programmable gate array of a host board in accordance with an embodiment of the present invention.

Referring next to FIG. 6, the host logic of a host board will be described in accordance with an embodiment of the present invention. The host logic 606 is arranged to interface with a connector 602 of an SFP module through low speed data lines 610, 612, 616, 618, as well as through high speed differential data lines 620, 622, via the external SERDES 640. Low speed data lines 610, 612, 616, 618 pass through selector or switch logic 630 of host logic 606 which allows low speed data lines 610, 612, 616, 618 to be sent to or processed using the appropriate logic, i.e., either T1/E1 logic, T3/E3 logic, or Status and Control logic. Selector 630 may, in one embodiment, include a multiplexer or a plurality of switches. High speed data lines 620, 622 are in communication with high speed logic 634 of host interface 606 through SERDES 640.

A bidirectional OC-48 trunk side signal 650 is generally connected to host logic 606. In the described embodiment, up to approximately eight ports of client traffic may be aggregated onto that OC-48 trunk circuit such that the sum of the client traffic is effectively no greater than the payload capacity of the trunk. Hence, as will be appreciated by those skilled in the art, any combination of data signals to available ports, e.g., eight ports, may comprise trunk side signal 650. For example, two T1 signals, three OC-3 signals, and one OC-12 signal may be multiplexed into trunk side OC-48 signal 650. Alternatively, two client side Gigabit Ethernet signals may be sent on the 2.5 Gigabit trunk, and the remaining available trunk bandwidth of approximately 500 Megabit/second in the described embodiment may be used to carry T1/E1 traffic (PBX data) along with the two Gigabit Ethernet signals.

Figure 7:
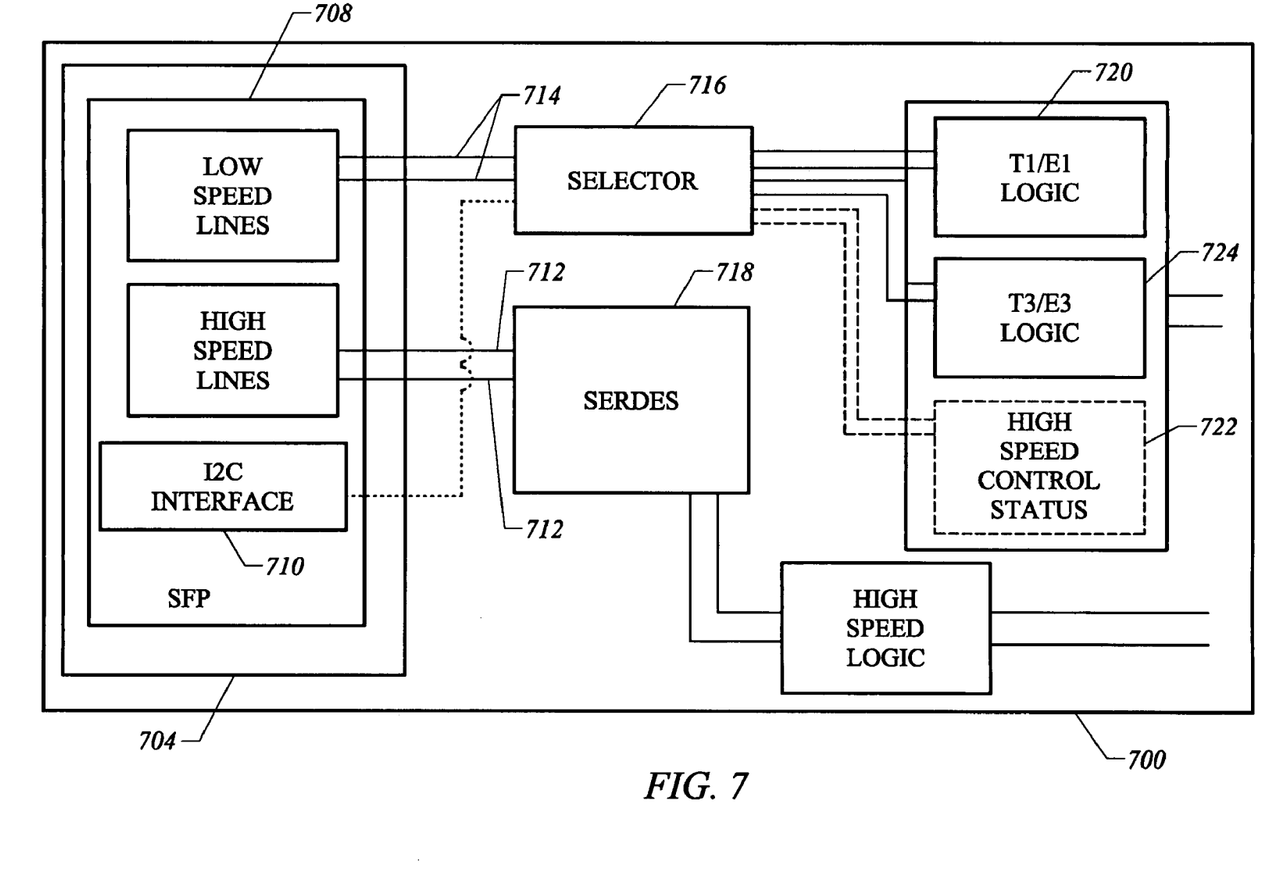
FIG. 7 is a block diagram representation of a portion of a host board which accepts an SFP compliant module in accordance with an embodiment of the present invention.

FIG. 7 is a block diagram representation of a portion of a host board which accepts an SFP compliant module in accordance with an embodiment of the present invention. A host board 700 includes an SFP connector block 704 which is arranged to accept an SFP module 708. An I2C interface 710 may be used to determine whether SFP module 708 is suitable for use in lower data rate telecom applications. In one embodiment, I2C interface 710 is used to read an ID ROM (not shown) of SFP module 708 to identify whether SFP module 708 is modified such that SFP module 708 may support either higher rate and lower data rate telecom applications.

High speed lines 712 are interfaced with a SERDES 718, while low speed data lines 714 interface with a selector 716, which may use information provided by I2C interface 710 to effectively identify a suitable logic to use to process data on low speed lines 714. When data on low speed lines 714 passes through selector 716 and is determined to be of a T1/E1 interface, T1/E1 logic 720 is used to process the data. T1/E1 logic 720 generally includes a framer which converts received frames into a T1/E1 signal by extracting relevant information from the data on low speed lines 714. When a T1/E1 interface is substantially the only lower data rate telecom interface supported, when the data on low speed lines 714 is not consistent with a T1/E1 interface, the data is routed to high speed control status logic 722. Alternatively, when other lower data rate telecom interfaces are supported, e.g., when a T3/E3 interface is supported, selector 716 may determine whether the data on low speed lines 714 is consistent with at T1/E1 interface, a T3/E3 interface, or high speed logic, and pass the data through T1/E1 logic 720, T3/E3 logic 724, or high speed control status logic 722, as appropriate.

It should be appreciated that data that is being transmitted from a host board through SFP module 708 may pass from the appropriate logic, e.g., from T1/E1 logic 720 or from high speed control status logic 722, through selector 716 onto low speed lines 714. That is, both data received by SFP module 708 from an outside source onto low speed lines 714 and data to be sent through SFP module 708 from host board 700 on low speed lines 714 have data paths which pass through selector 716.

Figure 8:
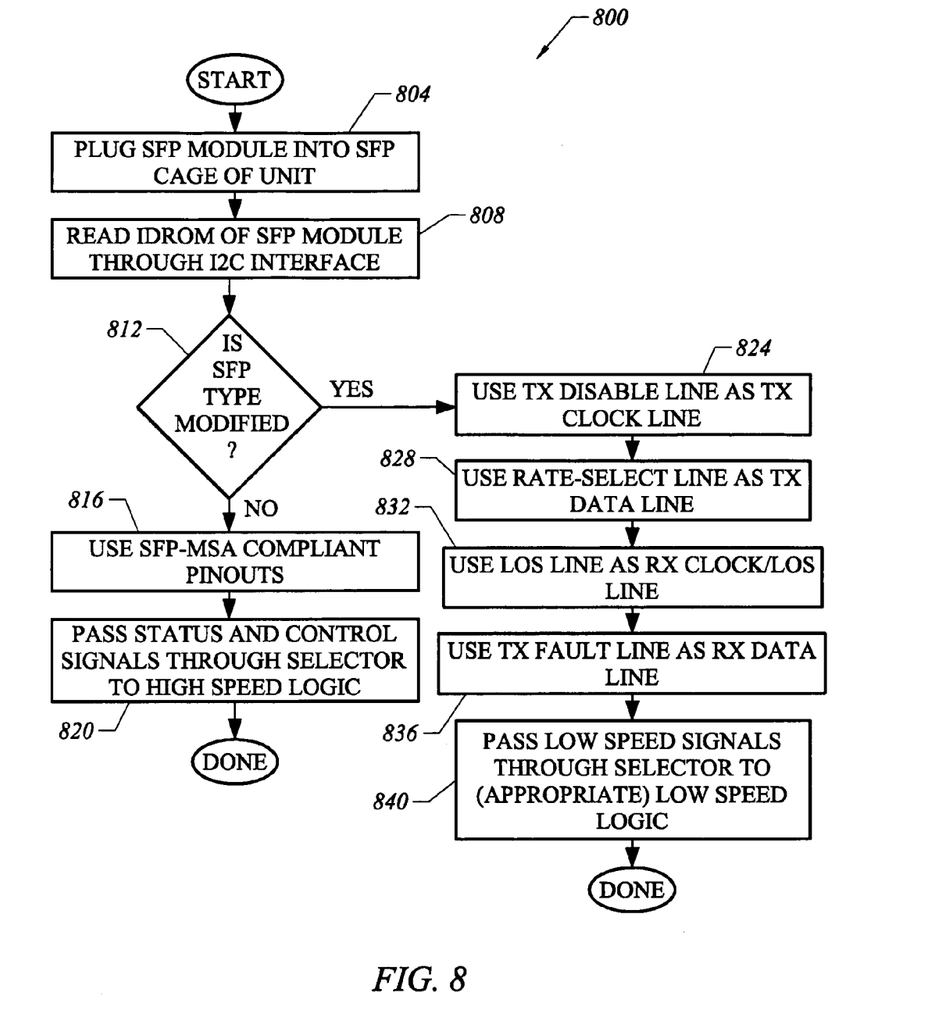
FIG. 8 is a process flow diagram which illustrates one method of using an SFP compliant module in accordance with an embodiment of the present invention.

With reference to FIG. 8, one method of using an SFP module, e.g., an SFP transceiver module, will be described in accordance with an embodiment of the present invention. A method 800 of using an SFP module begins at step 804 in which the SFP module is plugged into or otherwise interfaced with an SFP cage, or connector block, of a unit. The unit may be substantially any device that is a part of a node, e.g., a computing device, within a network. Once the SFP module is plugged into the connector block of the unit, the IDROM of the SFP module is read using the I2C interface of the SFP module in step 808. Reading the IDROM via the I2C interface generally enables a determination to be made of which type of SFP module is plugged into the connector block.

After the IDROM is read, it is determined in step 812 whether the SFP type of the module is modified. In other words, it is determined whether the SFP module plugged into the unit is suitable for use in transmitting low speed signals. If it is determined that the SFP type of the module is modified, the indication is that the SFP module is suitable for use in transmitting low speed signals. Accordingly, in step 824, the 'TX DISABLE' line associated with the SFP module is used as a 'TX CLOCK' line. The 'RATE-SELECT' line associated with the SFP module is used as a 'TX DATA' line in step 828, the 'LOS' line associated with the SFP module is used as both an 'RX CLOCK' line and an 'LOS' line in step 832, and the 'TX FAULT' line associated with the SFP module is used as an 'RX DATA' line in step 836. In other words, in step 824, 828, 832, and 836, the status and control lines associated with the SFP module are effectively replaced with a 'TX CLOCK' line, a 'TX DATA' line, an 'RX CLOCK' and 'LOS' line, and an 'RX DATA' line. In the described embodiment, substantially all other lines associated with the SFP module are SFP-MSA compliant.

Once the status and control lines are effectively replaced, low speed signals may pass in step 840 through the lines to a logic selector associated with the unit which then passes the low speed signals to the appropriate low speed logic, as discussed above with respect to FIG. 7. It should be appreciated that when substantially only a T1/E1 interface is supported, the selector passes the low speed signals to T1/E1 logic. However, when more than one type of low speed interface is supported, e.g., when a T1/E1 interface as well as a T3/E3 interface is supported, the selector determines which interface is appropriate for the low speed signal. The process of using an SFP module is completed once the low speed signals are passed through the selector.

Returning to step 812, if it is determined that the SFP type of the module is not modified, then the indication is that the SFP module is not used to support low speed interfaces. Accordingly, process flow moves to step 816 in which standard SFP-MSA compliant pinouts are used when signals are passed through the SFP module. Once signals are passed through the pins of the SFP module, status and control signals, are passed through the logic selector associated with the unit to high speed logic in step 820. That is, 'TX FAULT', 'TX DISABLE', 'RATE-SELECT', and 'LOS' signals are passed through the selector to high speed logic. The process of using an SFP module is completed once signals are passed through the selector.

Figure 9:
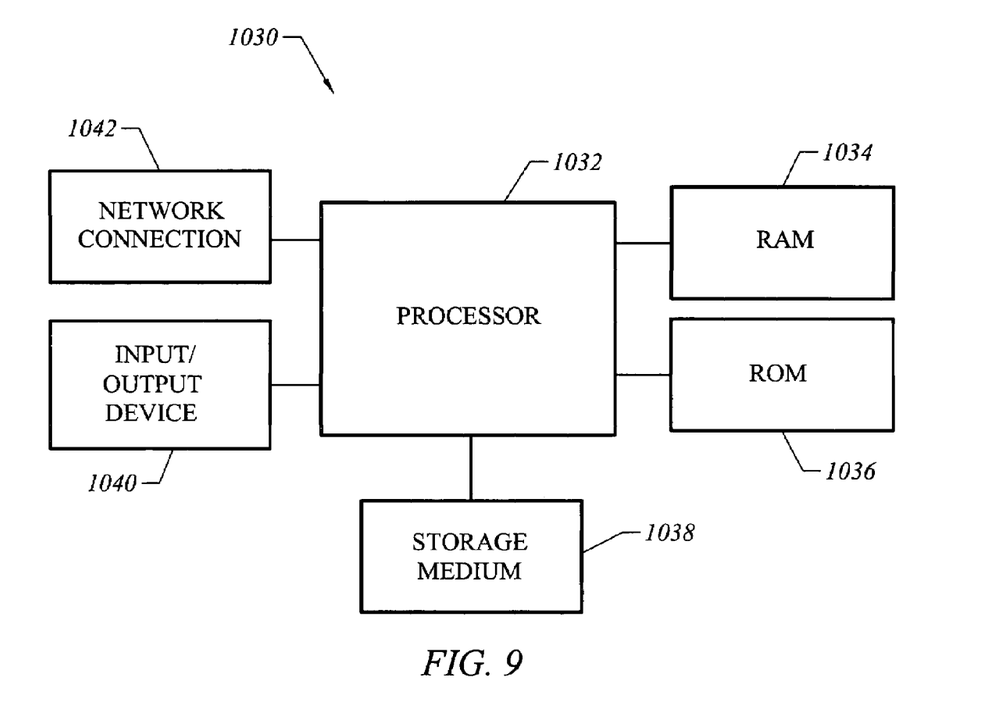
FIG. 9 illustrates a typical, general purpose computing device or computer system suitable for implementing the present invention.

FIG. 9 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. An SFP module may generally be associated with network connection 1042 such that the SFP module receives and transmits data. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the number of lower data rate telecom interfaces, including interfaces associated with both fiber and copper, supported by an SFP compliant module and a host interface which is compatible with the SFP compliant module, may vary widely. In addition, the types of lower data rate telecom interfaces, as well as the higher data rate telecom interfaces, supported by an SFP compliant module may also vary. Suitable telecom interfaces or client interfaces that may be supported by an SFP compliant module may include, but are not limited to, 1× Fiber Channel, FICON, Gigabit Ethernet, OC-12, DV1, ESCON, OC-3, Fast Ethernet, T3/E3, and T1/E1.

Status and control pins which may be substantially reassigned for use in supporting lower data rate telecom applications have generally been described as being reassigned such that a 'TX FAULT' status pin may be used as an 'RX DATA' pin, a 'TX DISABLE' control pin may be used as a 'TX CLOCK' pin, a 'RATE-SELECT' control pin may be used as a 'TX DATA' pin, and a 'LOS' status pin may be used as both an 'RX CLOCK' pin and as a 'LOS' pin. It should be appreciated, however, that the reassignment of status and control pins may vary. For instance, the 'TX DISABLE' control pin may be used as a 'TX DATA' pin in one embodiment.

An SFP compliant module which is suitable for use in both higher data rate telecom applications and lower data rate telecom applications may be used in a variety of different devices. Suitable devices may include, but are not limited to, personal computing systems, routers, and optical switches.

While an SFP compliant module may aggregate multiple ports, it should be appreciated that an SFP compliant module may not necessarily include an aggregator. That is, although an aggregator enables a trunk which supports higher speeds to also carry lower speeds, a trunk which supports higher speeds and is also suitable for carrying lower speeds does not necessarily include an aggregator. For instance, rather than make use of an aggregator, high speed interfaces may instead have an output associated with a lower speed interface.

In general, steps associated with the various methods of the present invention may be altered, reordered, added, and removed without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for providing a data path through a Small Form Factor Pluggable (SFP) transceiver, the SFP transceiver being substantially interfaced with a host device, the SFP transceiver including a plurality of single-ended pins, the method comprising:

determining if the SFP transceiver is suitable for use in supporting lower speed applications;

using the plurality of single-ended pins to provide at least one of a TX CLOCK signal, a TX DATA signal, an RX CLOCK signal, and an RX DATA signal when it is determined that the SFP transceiver is being used for the lower speed application; and using the plurality of single-ended pins to provide at least one control signal and at least one status signal when it is determined that the SFP transceiver is not being used for the lower speed application.

2. The method of claim 1 wherein when it is determined that the SFP transceiver is not being used for the lower speed application, the SFP transceiver is being used for a higher speed application.

3. The method of claim 2 wherein the higher speed application is one of a Fiber Channel application, a Gigabit Ethernet application, and a Fast Ethernet application.

4. The method of claim 2 wherein the at least one control signal and the at least one status signal include a TX FAULT signal, a TX DISABLE signal, a RATE-SELECT signal, and a Loss of Signal (LOS) signal.

5. The method of claim 1 wherein the at least one of the TX CLOCK signal, the TX DATA signal, the RX CLOCK signal, and the RX DATA signal is arranged to pass through a switching mechanism which is arranged to enable the plurality of single-ended pins to be in communication with a suitable logic module of the host device.

6. The method of claim 5 wherein the lower speed application is one of a T1/E1 application and a T3/E3 application, and the suitable logic module is one of a T1/E1 logic module and a T3/E3 logic module.

7. The method of claim 1 wherein determining when the SFP transceiver is suitable for use in supporting the lower speed application includes obtaining information from an ID ROM of the SFP transceiver.

8. The method of claim 1 wherein the lower speed application is one of a T1/E1 application and a T3/E3 application.

9. A method for providing a data path through a Small Form Factor Pluggable (SFP) transceiver, the SFP transceiver being substantially interfaced with a host device, the host device including a serializer-deserializer (SERDES) and a plurality of lines which substantially bypass the SERDES, the SFP transceiver including a plurality of pins which are arranged to interface with the plurality of lines which substantially bypass the SERDES, the method comprising:

using the plurality of pins arranged to interface with the plurality of lines which substantially bypass the SERDES to provide at least one control signal and at least one status signal;

determining when the SFP transceiver is arranged to be used to support lower speed applications; and using the plurality of pins arranged to interface with the plurality of lines which substantially bypass the SERDES to provide at least one of a TX CLOCK signal, a TX DATA signal, an RX CLOCK signal, and an RX DATA signal when it is determined that the SFP transceiver is arranged to support the lower speed applications.

10. The method of claim 9 wherein when it is determined that the SFP transceiver is not arranged to support the lower speed applications, the SFP transceiver is being used for a higher speed application.

11. The method of claim 10 wherein the higher speed application is one of a Fiber Channel application, a Gigabit Ethernet application, and a Fast Ethernet application.

12. The method of claim 9 wherein the at least one control signal and the at least one status signal include a TX FAULT signal, a TX DISABLE signal, a RATE-SELECT signal, and a Loss of Signal (LOS) signal.

13. The method of claim 9 wherein the at least one of the TX CLOCK signal, the TX DATA signal, the RX CLOCK signal, and the RX DATA signal is arranged to pass through a switching mechanism which is arranged to enable the plurality of single-ended pins to be in communication with a suitable logic module of the host device.

14. The method of claim 13 wherein the lower speed application is one of a T1/E1 application and a T3/E3 application, and the suitable logic module is one of a T1/E1 logic module and a T3/E3 logic module.

15. The method of claim 9 wherein determining when the SFP transceiver is suitable for use in supporting the lower speed application includes obtaining information from an ID ROM of the SFP transceiver.

16. The method of claim 9 wherein the lower speed application is one of a T1/E1 application and a T3/E3 application.

17. A device suitable for use in a network, the device comprising:

a board, the board including a connector block, a serializer-deserializer (SERDES), and a plurality of lines which are coupled to the connector block and substantially bypass the SERDES;

a Small Form Factor Pluggable (SFP) transceiver, the SFP transceiver being arranged to interface with the connector block, the SFP transceiver including a plurality of single-ended pins arranged to interface with the plurality of lines which are coupled to the connector block and substantially bypass the SERDES;

code devices for determining when the SFP transceiver is suitable for use in supporting lower speed applications;

code devices for using the plurality of pins to provide at least one of a TX CLOCK signal, a TX DATA signal, an RX CLOCK signal, and an RX DATA signal when it is determined that the SFP transceiver is arranged to support the lower speed applications; and code devices for using the plurality of single-ended pins to provide at least one control signal and at least one status signal when it is determined that the SFP transceiver is not arranged to support the lower speed applications.

18. The device of claim 17 wherein when it is determined that the SFP transceiver is not arranged to support the lower speed applications, the SFP transceiver is being used for a higher speed application.

19. The device of claim 18 wherein the higher speed application is one of a Fiber Channel application, a Gigabit Ethernet application, and a Fast Ethernet application, and the lower speed application is one of a T1/E1 application and a T3/E3 application.

20. The device of claim 17 wherein the at least one control signal and the at least one status signal include a TX FAULT signal, a TX DISABLE signal, a RATE-SELECT signal, and a Loss of Signal (LOS) signal.

21. The device of claim 17 wherein the board includes a switching mechanism and a plurality of logic modules, the switching mechanism being in communication with the plurality of logic modules, and wherein the at least one of the TX CLOCK signal, the TX DATA signal, the RX CLOCK signal, and the RX DATA signal is arranged to pass through the switching to a suitable logic module of the plurality of logic modules.

22. The device of claim 21 wherein the lower speed application is one of a T1/E1 application and a T3/E3 application, and the suitable logic module is one of a T1/E1 logic module and a T3/E3 logic module.

23. The device of claim 17 wherein the code devices for determining when the SFP transceiver is suitable for use in supporting the lower speed application include code devices for obtaining information from an ID ROM of the SFP transceiver.

24. The device of claim 17 wherein the lower speed application is one of a T1/E1 application and a T3/E3 application.

* * * * *